UNITED STATES PATENT OFFICE.

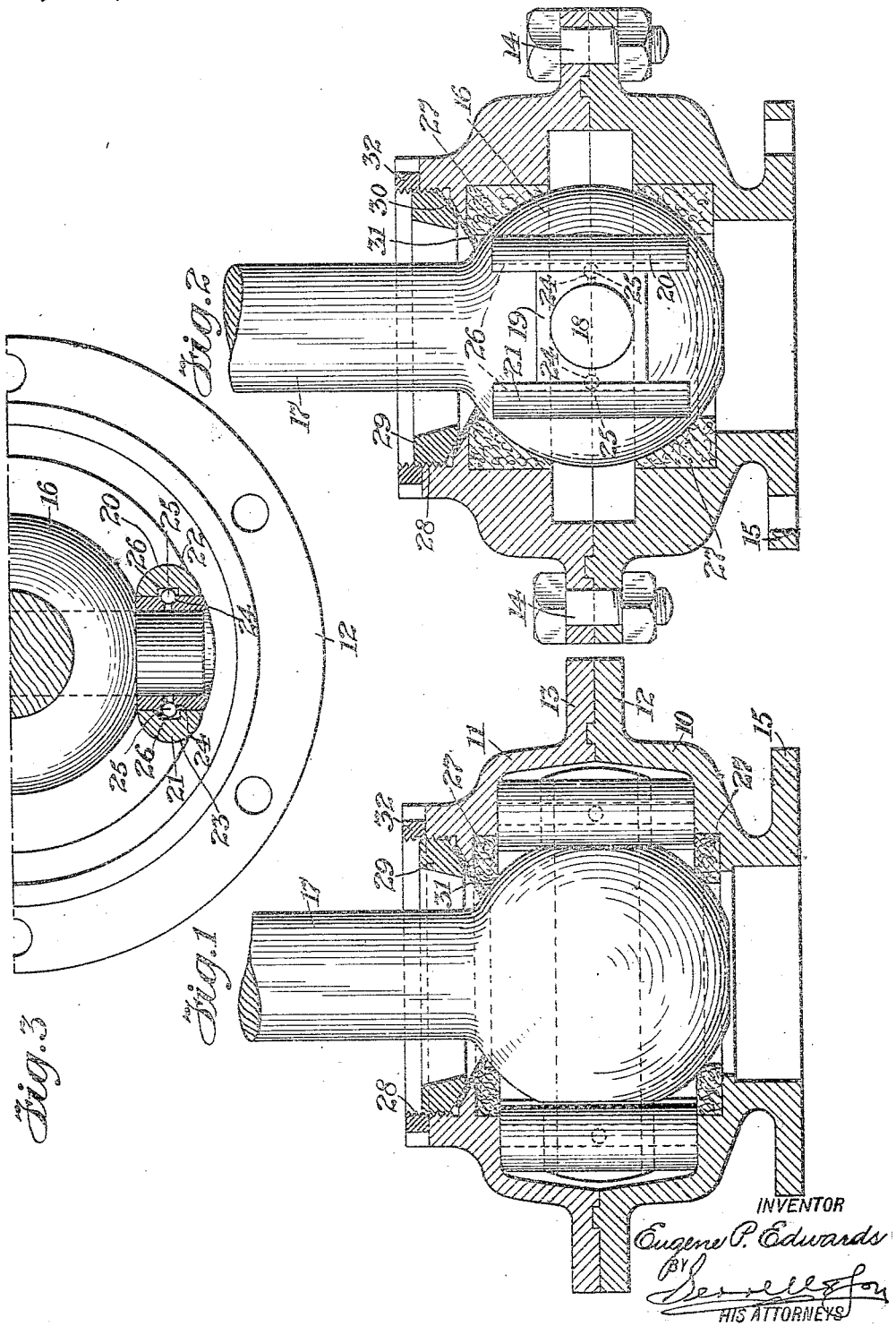

EUGENE P. EDWARDS, OF PLAINFIELD, NEW JERSEY.

UNIVERSAL JOINT.

1,278,889.  Specification of Letters Patent.  Patented Sept. 17, 1918.

Application filed August 9, 1917. Serial No. 185,272.

*To all whom it may concern:*

Be it known that I, EUGENE P. EDWARDS, a citizen of the United States, residing in Plainfield, in the county of Union and State of New Jersey, have invented an Improvement in Universal Joints, of which the following is a specification.

My present invention relates to a universal joint and more particularly to a universal joint which is an improvement upon the universal joints shown and described in Letters Patent No. 1,098,101 and No. 1,150,853 granted to me respectively on May 26, 1914 and August 24, 1915, the object of my present invention being to simplify the construction and thereby reduce the cost of the manufacture of this type of universal joint.

In the present structure as is the case in the structures shown in the patents aforesaid, I employ a housing adapted to receive the spherical end of a shaft. I also employ a pin passing diametrically through the spherical end of this shaft, but in other respects the present construction of universal joint differs from and is an improvement upon, in a practical sense, the forms of joints shown in my prior patents.

In carrying out this invention on each end of the pin passing through the spherical end of the shaft I employ a bearing block, and co-acting with each bearing block and suitably journaled in the parts of the housing so as to be self equalizing or adjusting, I employ liner members together with devices for maintaining the blocks in position longitudinally of the pin and relatively to their respective liner members. Also in the present case instead of employing ball bearings acting between the surface of the spherical end of the shaft and ball-ways provided therefor in the housing members I employ a fiber lining which not only takes up the end thrust on the shaft and thus maintains the spherical end in place, but also has a longer useful life than can possibly be obtained with the ball bearing structure. This invention also includes an improvement upon the dirt excluding device shown in the Letters Patent granted to me as aforesaid, and which together with the other improved features will be hereinafter more particularly described.

In the drawing:

Figure 1 is a central cross section of the universal joint made in accordance with my present invention.

Fig. 2 is a central cross section taken at right angles to the position of that shown in Fig. 1, and Fig. 3 is a partial sectional plan taken centrally through the universal joint.

Referring to the drawing in carrying out this invention as is customary in universal joints, I employ a housing made in two parts which are indicated at 10 and 11 respectively. The housing member 10 is provided with a flange 12 and the housing member 11 with a flange 13. These flanges are adapted to abut against one another and the members of the housing secured together by means of bolts 14 passed through suitable holes provided therefor in these flanges, or otherwise, and at its opposite end the housing member 10 is provided with a flange 15 by means of which it may be suitably connected to a shaft.

The members of the housing are adapted to receive the spherical end 16 of a shaft 17 which passes through an opening provided therefor in the housing member 11. Passing diametrically through the spherical shaft end 16 and suitably secured therein is a pin 18 and this pin 18 is of sufficient length so as to project an appreciable distance beyond the spherical end 16 on the opposite sides thereof. On each projecting end of the pin 18 I employ a bearing block 19. Each bearing block is preferably rectangular in cross section so as to provide an extended bearing surface against the liner members 20 and 21 with which the opposite surfaces of each bearing block contact in the operation of the joint. Within the housing members there are semi-circular recesses 22 and 23 forming bearings for the correspondingly shaped sides of the liner members 20 and 21 respectively, as clearly indicated in Fig. 3 of the drawing.

Each bearing surface of both bearing blocks is provided with a recess indicated at 24 and adapted to receive a ball 25 or other similar spherical structure, while the adjacent surface of each liner member is provided with a groove 26 in which a portion of the corresponding ball 25 may run in the operation of the universal joint in order, as will be understood, to maintain the bearing block in position on the end of the pin and in place relatively to its liner member.

As hereinbefore stated, instead of employing ball bearings co-acting between the spherical shaft end and the housing members, in this instance I prefer to employ fiber packing rings 27 fitting within recesses provided therefor within the housing members and adapted to contact with the spherical shaft end to take up the thrust of the shaft and maintain the same in position relatively to the housing.

That end of the housing member 11 through which the shaft 17 passes is interiorly screw-threaded as indicated at 28 and adapted to receive the screw threaded ring 29 which may be turned down in order to maintain in position a washer 31 made of felt, fiber, or any other suitable material, it being noted that the inner end 30 of the ring 29 is tapered and the adjacent surface of the housing member is similarly tapered so that the washer is gripped between these tapering surfaces and maintained in such a position that its inner end will contact with a portion of the spherical shaft end so as to act as a dust and dirt excluder. In order to maintain the ring 29 in position the same may be made sufficiently long to extend beyond the end of the housing member 11 when it is turned to place and fitted with a lock nut 32 turned down on the ring 29 against the outer surface of the housing member 11 so as to maintain the ring 29 in the position in which it is originally fixed.

I claim as my invention:

1. A universal joint comprising a housing, a shaft having a spherical end lying within said housing, projections from opposite portions of the said spherical shaft end, a block on each projection, and liner bearing members journaled in the housing and with which the said blocks co-act in the operation of the universal joint.

2. A universal joint comprising a housing, a shaft having a spherical end lying within the said housing, a pin passing through and projecting appreciable distances from the surface of the spherical shaft end, a block mounted on each projecting end of the pin, and self adjusting liner bearings journaled in said housing and co-acting with said blocks in the operation of the universal joint.

3. A universal joint comprising a housing, a shaft having a spherical end lying within the said housing, a pin passing through and projecting appreciable distances from the surface of the spherical shaft end, a block mounted on each projecting end of the pin, self adjusting liner bearings journaled in said housing and co-acting with said blocks in the operation of the universal joint, and means for maintaining the said blocks in position on the ends of said pin and relatively to the said liner bearings.

4. A universal joint comprising a housing, a shaft having a spherical end lying within the said housing, a pin passing through and projecting appreciable distances from the surface of the spherical shaft end, a block mounted on each projecting end of the pin, self adjusting liner bearings journaled in said housing and co-acting with said blocks in the operation of the universal joint, and means co-acting between said blocks and their liner bearings for preventing the blocks from working off the ends of the pin.

5. A universal joint comprising a housing, a shaft having a spherical end lying within the housing, a pin passing through the spherical shaft end and projecting appreciable distances beyond the same on opposite sides thereof, a block on each projecting end of the pin and having a recess in each bearing surface thereof, self adjusting liner bearings journaled in said housing and against which the said blocks bear in the use of the universal joint, each liner bearing being provided with a longitudinal groove, a ball lying within the recess in each block and adapted to run in the groove in the corresponding liner bearing to maintain the block in position on the pin relatively to its liner bearings.

6. A universal joint comprising a housing, a shaft having a spherical end lying within the housing, a pin passing through the spherical shaft end and projecting appreciable distances beyond the same on opposite sides thereof, a block on each projecting end of the pin and having a recess in each bearing surface thereof, minor bearings each having a flat surface with which the ball surface of one of said blocks contacts and in which there is a longitudinal groove, a curved surface adapted to fit within a similarly curved surface in the housing which acts as a bearing therefor, and a ball lying within the recess in each block and adapted to run in the groove in the corresponding liner bearing to maintain the block in position on the pin relatively to its liner bearings.

7. A universal joint comprising a housing, a shaft passing through one part of said housing and having a spherical end lying within the housing, means associated with the spherical end of the shaft and co-acting with the housing for imparting a rotary motion from the shaft to the housing, a screw threaded ring surrounding said shaft and adapted to be turned down in a screw threaded opening in the housing, a washer secured in place between the said ring and the adjacent portion of the housing, and means for locking the said ring in position.

8. A universal joint comprising a housing, a shaft passing through one part of said housing and having a spherical end lying within the housing, means associated with the spherical end of the shaft and co-acting with the housing for imparting a rotary motion from the shaft to the housing, a ring surrounding said shaft and adapted to be turned down in a screw threaded portion of the housing through which the said shaft passes, a washer secured in position between the inner end of the said ring and the adjacent portion of the housing and adapted to bear against a portion of the spherical end of the shaft to exclude dust and dirt from the interior of the housing, and a lock nut turned down exteriorly on the said ring against the outer surface of the housing to secure the ring in position therein.

9. A universal joint comprising a housing, a shaft passing through an opening in the housing and terminating in a spherical end lying within the housing, means associated with the spherical end of the shaft in the housing for imparting the rotary motion from the shaft to the housing, and fiber packing rings fitted within the housing and adapted to contact with portions of the said spherical end of the shaft to take up the end thrust on the shaft and secure the same in position.

Signed by me this 28th day of July 1917.

EUGENE P. EDWARDS.